US012400088B1

United States Patent
Davis et al.

(10) Patent No.: US 12,400,088 B1
(45) Date of Patent: Aug. 26, 2025

(54) COMMUNICATION CHANNEL QUALITY IMPROVEMENT SYSTEM USING MACHINE CONVERSIONS

(71) Applicant: Height Ventures, LLC, Salt Lake City, UT (US)

(72) Inventors: Ken R. Davis, Salt Lake City, UT (US); Fraser M. Smith, Salt Lake City, UT (US)

(73) Assignee: Height Ventures, LLC, Salt Lake City, UT (US)

( * ) Notice: Subject to any disclaimer, the term of this patent is extended or adjusted under 35 U.S.C. 154(b) by 0 days.

(21) Appl. No.: 18/646,576

(22) Filed: Apr. 25, 2024

(51) Int. Cl.
| | |
|---|---|
| *G06F 40/58* | (2020.01) |
| *G06F 40/103* | (2020.01) |
| *G06F 40/166* | (2020.01) |
| *G06F 40/51* | (2020.01) |
| *G10L 15/18* | (2013.01) |
| *G10L 21/013* | (2013.01) |

(52) U.S. Cl.
CPC ............ *G06F 40/58* (2020.01); *G06F 40/103* (2020.01); *G06F 40/166* (2020.01); *G06F 40/51* (2020.01); *G10L 15/1822* (2013.01); *G10L 21/013* (2013.01); *G10L 2021/0135* (2013.01)

(58) Field of Classification Search
CPC ........ G06F 40/58; G06F 40/166; G06F 40/51; G06F 40/103; G10L 2021/0135; G10L 21/013; G10L 15/1822
USPC ............................................................ 704/3
See application file for complete search history.

(56) References Cited

U.S. PATENT DOCUMENTS

| | | | |
|---|---|---|---|
| 7,711,105 B2 * | 5/2010 | Basson | H04M 3/5233 379/265.12 |
| 10,346,544 B2 | 7/2019 | Brophy et al. | |
| 10,348,658 B2 * | 7/2019 | Rodriguez | H04L 51/10 |
| 10,404,636 B2 * | 9/2019 | Rodriguez | H04L 51/04 |
| 10,431,201 B1 | 10/2019 | Pore et al. | |
| 10,880,243 B2 * | 12/2020 | Rodriguez | H04L 51/046 |
| 11,050,694 B2 * | 6/2021 | Rodriguez | G06Q 10/101 |
| 11,450,311 B2 | 9/2022 | Feinauer et al. | |
| 11,451,499 B2 * | 9/2022 | Rodriguez | H04L 51/04 |
| 12,008,335 B2 * | 6/2024 | Takamiya | G06F 40/58 |
| 2006/0067508 A1 * | 3/2006 | Basson | H04M 3/5233 379/265.12 |
| 2010/0082326 A1 | 4/2010 | Bangalore et al. | |

(Continued)

OTHER PUBLICATIONS

Campbell, Amazon adds Live Translation to Alexa's toolbox of skills, The Verge, Dec. 14, 2020, 5 pages, Vox Media, New York, New York.

(Continued)

*Primary Examiner* — Vijay B Chawan
(74) *Attorney, Agent, or Firm* — Christopher L. Johnson

(57) ABSTRACT

Technology is described for adding inserted message data into machine learning modified communications. The method can include receiving message data from a sender to be sent to a recipient. Another operation may be estimating a conversion time to convert the message data to a second language that is different than a language of the sender, using a machine learning translation service. A message insert may be provided or identified that approximates the conversion time. The message insert to be reproduced for the recipient may be sent. The message data may be sent to the recipient as converted to the second language.

14 Claims, 10 Drawing Sheets

(56) References Cited

U.S. PATENT DOCUMENTS

| | | | |
|---|---|---|---|
| 2014/0236595 A1 | 8/2014 | Gray | |
| 2015/0073770 A1 | 3/2015 | Pulz et al. | |
| 2016/0293159 A1 | 10/2016 | Belisario et al. | |
| 2017/0039190 A1* | 2/2017 | Ricardo | G06F 40/58 |
| 2018/0174595 A1* | 6/2018 | Dirac | G10L 21/013 |
| 2018/0277132 A1 | 9/2018 | LeVoit | |
| 2018/0367483 A1* | 12/2018 | Rodriguez | H04L 51/046 |
| 2018/0367484 A1* | 12/2018 | Rodriguez | H04L 67/75 |
| 2019/0141004 A1* | 5/2019 | Eck | H04L 51/52 |
| 2019/0295527 A1 | 9/2019 | Pore et al. | |
| 2019/0297039 A1* | 9/2019 | Rodriguez | H04L 51/02 |
| 2019/0394147 A1* | 12/2019 | Rodriguez | H04L 51/046 |
| 2020/0184278 A1 | 6/2020 | Zadeh et al. | |
| 2020/0193971 A1 | 6/2020 | Feinauer et al. | |
| 2021/0152503 A1* | 5/2021 | Rodriguez | H04L 51/04 |
| 2022/0121884 A1 | 4/2022 | Zadeh et al. | |

OTHER PUBLICATIONS

Google, Translate with Google Pixel Buds, https://support.google.com/googlepixelbuds/answer/7573100?hl=en, retrieved on Apr. 18, 2023, 4 pages.

Microsoft, Customer Support, https://www.microsoft.com/en-us/translator/business.support/, retrieved on Apr. 18, 2023, 3 pages.

Microsoft, Machine Translation, https://www.microsoft.com/en-us/translator/business/machine-translation/, retrieved on Apr. 18, 2023, 9 pages.

Microsoft, Microsoft Translator, https://www.skype.com/en/features/skype-translator/, retrieved on Apr. 18, 2023, 3 pages.

Microsoft, Skype Translator, https://www.skype.com/en/features/skype-translator/, retrieved on Apr. 18, 2023, 5 pages.

Mohan et al., Microsoft Translator: Now translating 100 languages and counting, https://www.microsoft.com/en-us/research/blog/microsoft-translator-now-translating-100-languages-and-counting/, Oct. 11, 2021, 7 pages.

* cited by examiner

COMMUNICATION CHANNEL QUALITY IMPROVEMENT SYSTEM USING MACHINE CONVERSIONS

BACKGROUND

Offshoring may describe the relocation of a business function from one country to another. The process is often an operational process, such as manufacturing, or supporting processes, such as accounting. Usually this term describes a private business that moves business processes from one country to another country. All kinds of manufacturing and services can be "offshored". For example, support services, technical services and administrative services have been offshored.

Many companies in the US and other higher cost countries have worked to reduce business costs by offshoring of specific services such as: programming, tech support calls, manufacturing, etc. Offshoring may be cost effective and may reduce the costs of services such as call center costs.

When offshoring call center services or other support services, there tends to be language barrier between those receiving the services and the call center agents. Sometimes a customer may even refuse to talk to a support agent because they cannot understand the call agents accent or due to other cultural issues. Sometimes the difference in accent, grammar, culture, linguistic aspects and/or the electronic connection quality can cause miscommunication between the offshore service providers and those receiving the services, even when the substantive information being communicated might otherwise be correct.

DETAILED DESCRIPTION OF THE PREFERRED EMBODIMENTS

Figure 1:
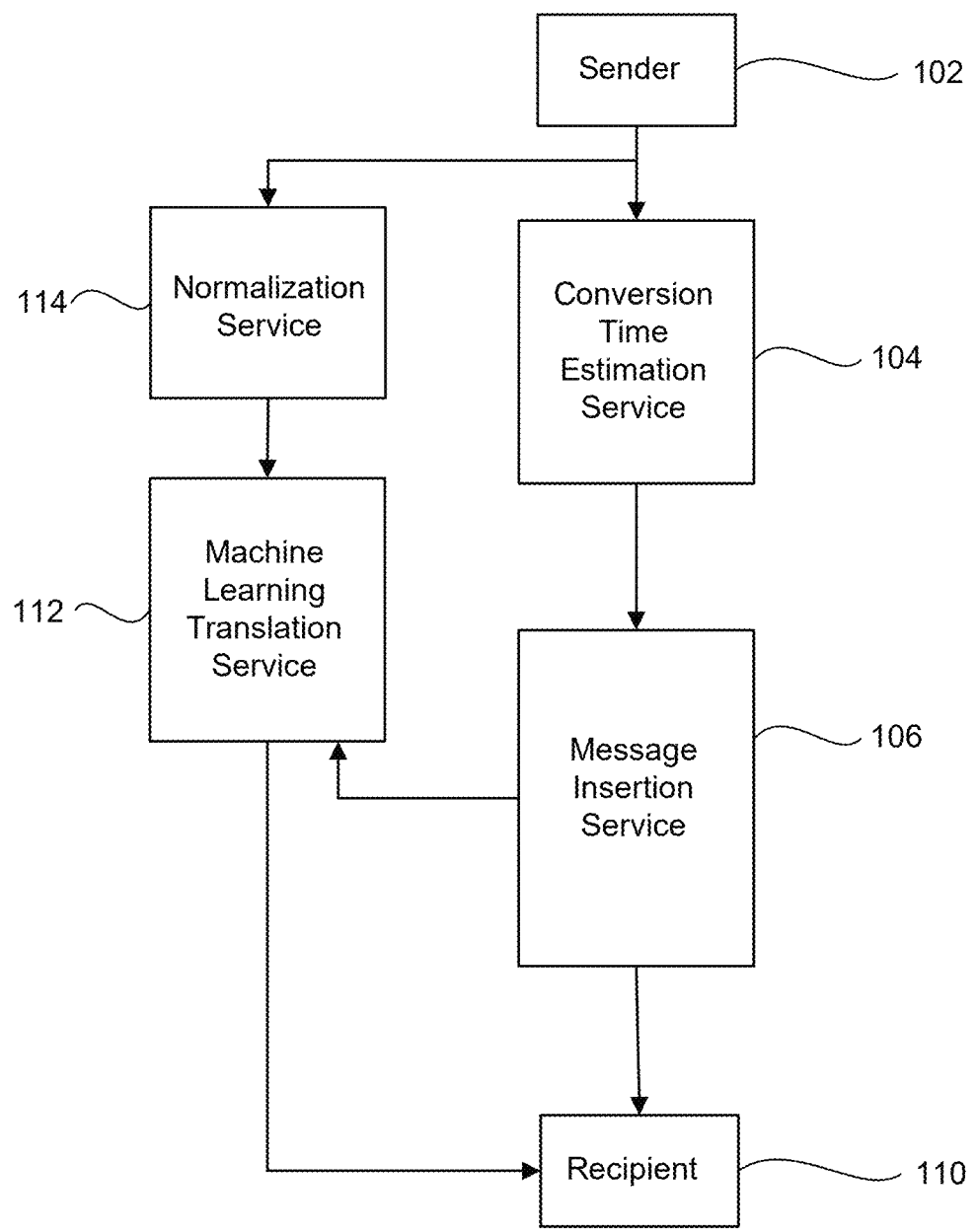
FIG. 1 is a block diagram illustrating an example of a technology for adding inserted message data into machine learning modified communications that are sent across a computer network.

Reference will now be made to the examples illustrated in the drawings, and specific language will be used herein to describe the same. It will nevertheless be understood that no limitation of the scope of the technology is thereby intended. Alterations and further modifications of the features illustrated herein, and additional applications of the examples as illustrated herein, which would occur to one skilled in the relevant art and having possession of this disclosure, are to be considered within the scope of the description.

Figure 8:
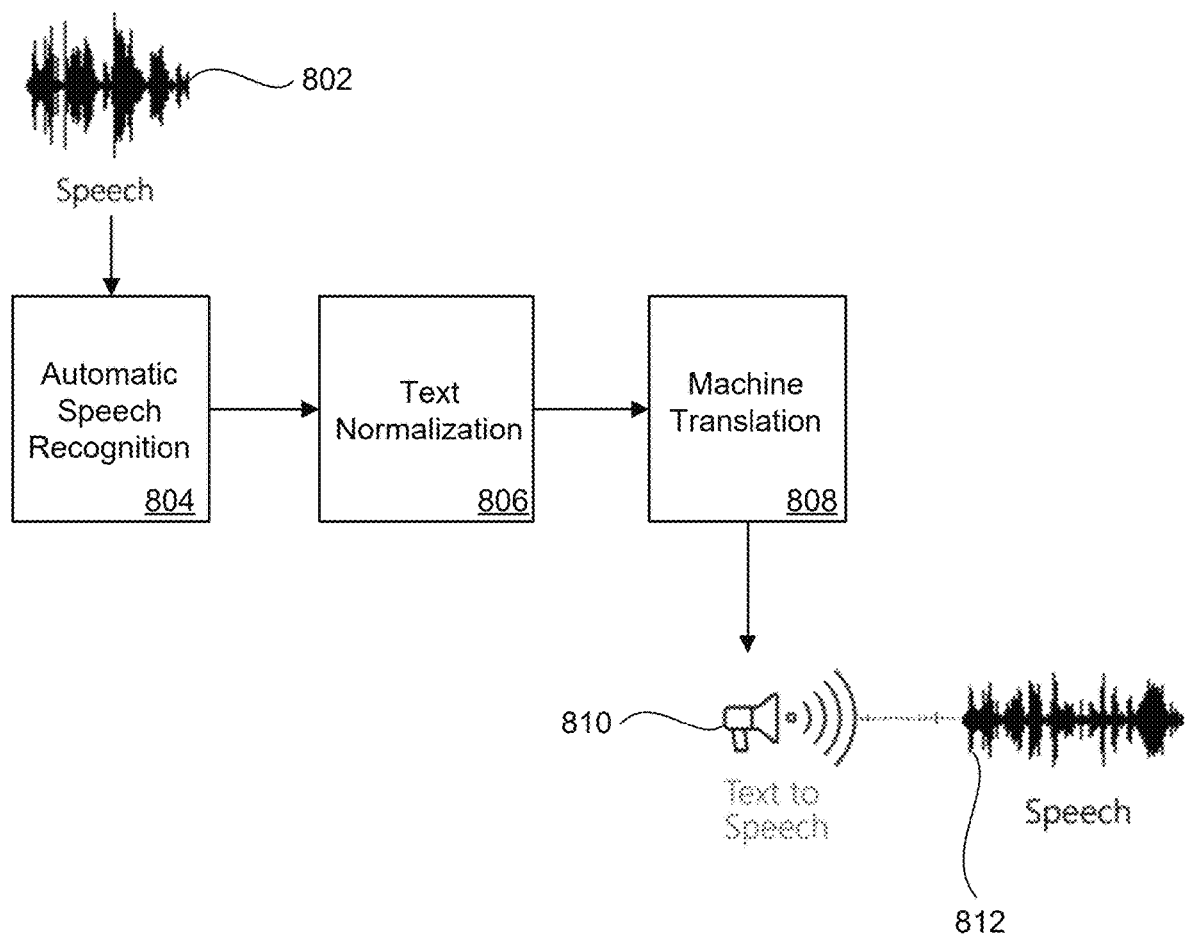
FIG. 8 is a block diagram illustrating an example that speech can be provided to an automatic speech recognition service in order to convert audio into text and then into a second language.

Computers have been able to translate text or speech for some time. For previously existing computing systems to properly translate the "source" speech from one language to a different "target" language, the system may go through a several step process. FIG. 8 is a block diagram illustrating an example that speech 802 can be provided to an automatic speech recognition service 804, to convert audio into text.

The text from the speech recognition service 804 may be processed by a text normalization service 806 that normalizes the text to make the text more appropriate for translation. This may mean that the text is corrected grammatically, mechanically and/or semantically.

Translation of the text to a second language may occur through the machine translation service 808. The machine translation may use a neural network (e.g., a long short-term model), deep neural network or another machine learning model. For example, the machine learning may use translation models developed for real life spoken conversations.

A text-to-speech service 810 may be used to produce the translated audio 812 for output. This allows the text to be "spoken" to the recipient or reproduced by the computer, using the desired language output (e.g., a translation from English to German).

The present technology may use machine learning translation system (e.g., neural networks, GPT (Generative Pre-Trained Transformer) AI building blocks) for interfacing with customers of a company or group. For example, this technology may be used in support center interactions with customers of a company. The technology may be for a system for quality improvement for customer interactions over a computer network (e.g., the internet).

In one example configuration, the system and method may provide correction and/or translation of support center representative and/or customer language (i.e., either direction or both) to clarify communication of desired information. The system may correct the language of the person who is sending the message, including: grammar (and spelling if a text-based exchange via text chat or e-mail), replacement of slang terms with standard usage terms, replacement of inappropriate idioms (typically caused by not being completely fluent in the language being used), replacement of incorrect words (again, typically caused by not being completely fluent in the language being used), and/or optionally changing the talking rate (words spoken/minute) to rates that are consistent with better communication by people (speeding up or slowing down, as needed). Options for changing a user's voice may also be customized to given users depending on known preferences. The voice customizations may include: changing the pitch of the voice, changing the gender of the voice, conversion to an accent that receiving party can clearly understand or a complete translation to an alternative language if the support center representative and the customer do not speak the same language.

In summary, the present technology may correct, clarify or translate interchanges to minimize ambiguity and misunderstanding, and thereby increasing overall efficiency and maximizing user satisfaction. The corrections and translations can be performed in both communication directions. For example, an English speaker may be corrected and converted to text, then translated to Spanish. A Spanish speaking customer representative may then hear or read the message. The Spanish speaking customer representative may speak or write a reply that is corrected using the machine learning. The reply may then be converted by the machine learning to spoken English that the customer will hear.

FIG. 1 is a block diagram illustrating a technology for adding inserted message data into machine learning modified communications that are sent across a computer network. Message data received as input may be received from a sender 102 to be ultimately sent to a recipient 108. The message data may be speech data, text data, or video data that is to be sent over a computer network (e.g., the internet) to the recipient 208 for playback or presentation to the recipient 208. The message data received as input that is speech data or text data may be output as speech data or text data. The speech data or text data may be translated using machine learning so that the speech data or text data is translated to another language (e.g., Hindi to English).

A conversion time to convert the message data to a second language that is different than a language of the sender may be estimated by a conversion time estimation service 104 or estimation service. The conversion to the second language may be a conversion to a second human language, a different dialect or a different accent. This conversion time may be calculated in seconds or milliseconds as appropriate. However, this delay may be detectable by humans who are receiving the message.

The conversion time estimation service 104 may also estimate a correction time to correct language errors in the message data using a normalization service 114 to provide a corrected message. Examples of correcting language errors may be correcting at least one of: grammar correction, slang term correction, euphemism and parlance corrections, incorrect term correction, incorrect words, user customizations, removal of filler words, speech disfluencies, repetitions, stuttering, sentence breaks, or punctuation. The conversion time estimation service 104 may be part of a machine learning translation service or the conversion time estimation service 104 may be in communication with the machine learning translation service 112.

A message insertion service 106 may provide a message insert that approximates the conversion time. Furthermore, a message insert may be sent that approximates both a correction time and language conversion time.

The system and process may create and/or use use-case-specific libraries containing statements commonly used by people or users when carrying out the same interactions for the given task. The message insert may be a message insert that is added from a library of at least one of: sounds, spoken phrases, text phrases, or video clips. A pre-recorded message insert (i.e., an insert that the service agent did not actually say) may include things like, "Let me check on that item.", "Waiting for a translation.", "I'm looking it up.", "My computer is slow.", a brief ad, etc. Alternatively, the pre-recorded message may be music, typing sounds, tones, clicks or other message inserts.

In one example, the system may present an image or message on the screen when the correction and/or translation is taking place. For example, text may be presented to describe what parts of the process are being performed. Icons may also be displayed for actions in the process. Thus, a sound, image, character, video or animation may be used to denote delay. This notification can be used to fill out the asynchronous aspect of the correction and translation.

The system or process may be capable of adjusting the auto-filler statements to match or exceed a latency period being experienced or estimated. This may mean that the system is adaptive to communication quality and latency being experienced over a given connection. A time length of the message insert may be adjusted to match or exceed a latency period that has been estimated for conversion of a message to a second language. Adjustments may include padding a message insert at the beginning or ending with quiet time or music.

In one aspect, this technology may be considered a latency auto-filler. The system may automatically fill the time before a message can be corrected and/or translated. As described earlier, a computer-generated and/or computer-selected "filler phrase" may be inserted between a customer statement and support center representative response to eliminate what would otherwise be perceived to be response latency due to the correction and translation of the messages from the support center representative.

In an example use of this technology, the technology may be used in communication between a customer representative and a customer. A support center representative and customer may be the respective parties at each end of a given interaction. The term user as used in this description is meant to include both the "support center representative" and the "customer" in a single term to indicate that the system can provide corrections and translations in both communication directions. The system may be used for support center representative interactions with physically remote customers using a number of communication channels. The communication channels may include at least of: (i) voice communications, text chat interchanges, e-mail exchanges, video exchanges or other electronic communication channels, etc.

The voice of the support center representative may be replaced with a computer-generated voice. The support center representative may not natively speak the language of a recipient of the messages (e.g., a customer). The translated voice may be rendered to the recipient as the language of the recipient. In addition, the translated voice may be output or rendered in a different accent than the sender used to speak the message. This allows the accent of the support center representative to be replaced with (i) a neutral accent, or (ii) an accent chosen to be the same as the customer's accent, (iii) an accent that is determined to perform better with a recipient or customer than a previously selected accent, (iv) a customer-preferred (i.e., customer-selected) accent, or (v) an accent potentially capable of facilitating communications between people speaking different languages altogether, rather than just correcting and clarifying a support center representative's expression in the customer's language.

The system may be extended to being adapted to disabled people with special needs at either end or both (i.e., the support center and/or the customer ends). The same modifications (e.g., corrections and translations) to messages may still occur, but the messages may be presented using output forms that are useful for those who are visually impaired, hearing impaired or other have special needs in consuming the corrected and translated messages.

The system may notify the recipient that they are being supported by a human but the communication session is being translated by machine learning. This way the customer or recipient may be aware of any anomalies that may occur due to the machine learning translations.

In an example use case scenario, a customer may be looking to change a flight or receive technical support for a software product. The translation machine learning service can reside in the middle of the communication session that is taking place. This way the customer may hear the most respected accent in their language. For instance, the most respected accent may be at the center of the country and newscaster accent. This may be the clearest accent to many customers and they can most clearly understand that respected accent. It is likely that the customer support agent may say words that are grammatically incorrect. The text normalization service may correct the grammar of the text converted from speech. The machine learning may then translate the text to a corrected sentence. The corrected sentence may be translated to a second language and then output to the recipient or customer. This process may allow the customer representative (e.g., speaking Hindi) to reply to a question from an English speaking customer and the reply is heard by the customer as being in a respected English accent and with the correct grammar.

In the past, in order to support a customer, you needed to have the agent supporting the customer speak the same language as the customer. If the customer is an English speaker then an English speaking customer support agent was needed to support the customer. This system allows a customer and agent that speak different languages to interact without actually sharing a common language.

Suppression

Figure 2:
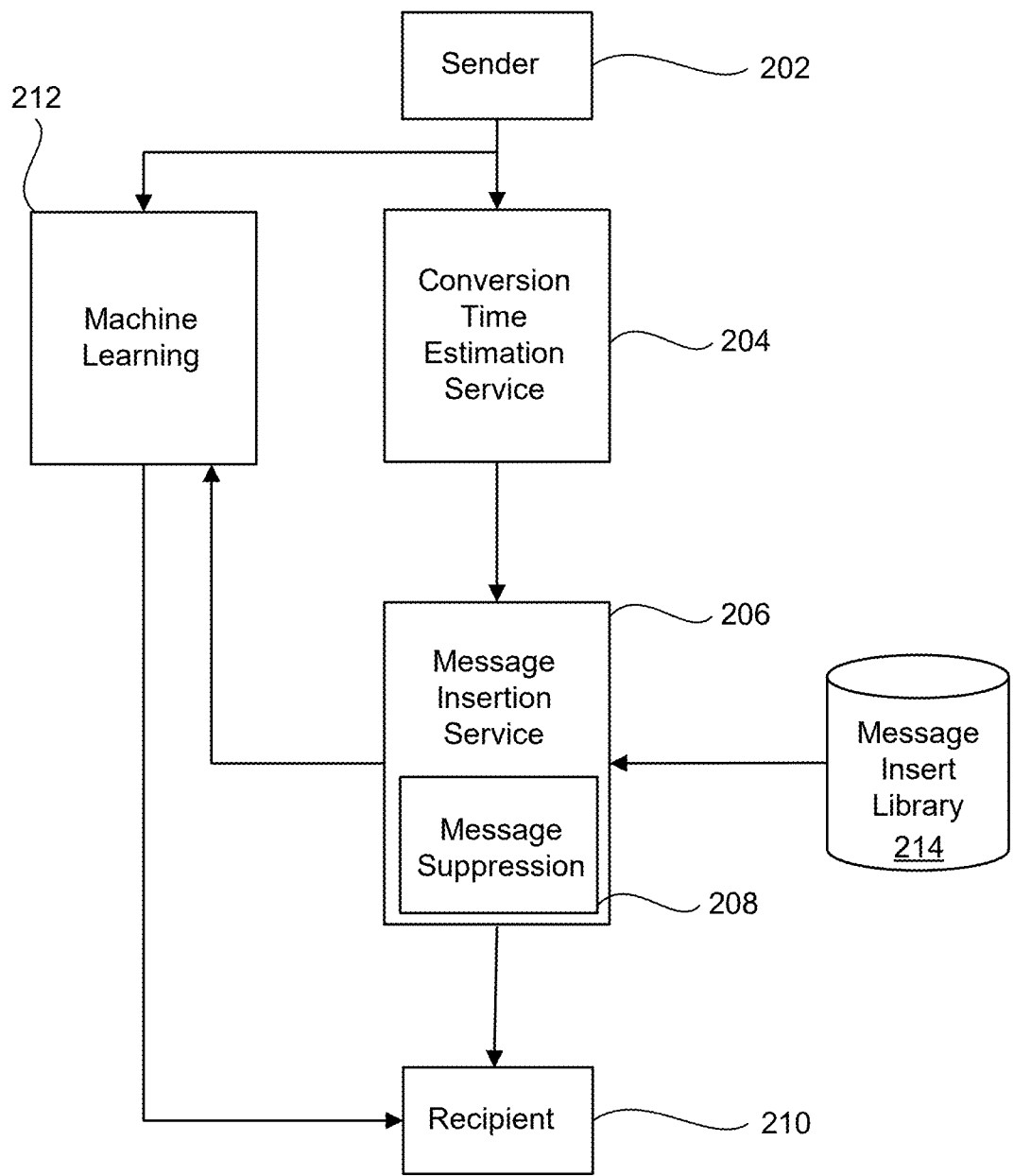
FIG. 2 is a block diagram that is an example of a message suppression service used to notify the machine learning services or message transmission services when a message insert from a message insertion service is similar to a recently provided message phrase from a user.

The system may be capable of avoiding the use of any recently duplicated statement or word already used by user (e.g., a support center representative), as illustrated in FIG. 2. There may be a situation where the message phrase sent by the sender ends up being the same or similar to the message phrase or word recently (e.g., within a defined time frame) selected as the message insert. For example, if the sender says "Please wait just one moment" or "OK" and this same phrase or similar phrase is going to be used in the message insert, then the message phrase sent by the sender can be suppressed and may not be provided as output the recipient 210.

FIG. 2 illustrates that a message suppression service 208 may be used to notify the machine learning services 212 or message transmission services when the message phrase is similar to a recently provided message insert from a message insertion service 208. The suppression service 208 may instruct the machine learning services 212 or message transmission services to suppress the substantially duplicate message(s). The suppression service 208 might alternatively trade the duplicate message insert with a different message insert when the message insert is the same as a phrase used by the sender. For example, the duplicated phrase "Please wait just one moment" could be switched out for typing sounds, ambient sounds, ambient music or music.

The message inserts may be provided from or retrieved from a library of message inserts 214. The library of message inserts 214 may be a topically related library, use case library, or a task related library. In another example, the message inserts may be retrieved on the basis of the recipient's demographics, such as their country, language, purchase history, etc. The message inserts 214 may also be selected based on a relevance factor with the subject matter of the session, relevance to a customer, relevance to a product, relevance to a service, etc.

A message insert may be further selected to match a task estimation time for a defined task for a human agent. For example, a message insert may be selected to match a task estimation time of two minutes for a defined task (e.g., looking up a data record) for a human agent. The task estimation time may be received from an estimation process embedded in an application or a software process monitoring the human agent. For example, if the human agent is looking up a fix to technical problem and the software process estimates that it will take 3 minutes to lookup the information, then the message insert may be three minutes long.

The message insert may be sent to be reproduced for the recipient 208. While the message insert is being sent to the recipient 208, the message data may be converted to the second language or accent using the machine learning 212. For example, speech data may be converted to text data using a speech recognition service. In other examples, text data may be converted to speech data, text data may converted to different text data, video data may have a converted audio track, etc. The machine learning 212 used may be a generative artificial intelligence (AI) system such as a deep neural network or similar generative AI or machine learning that can convert a first language to a second language with a high level of accuracy.

The message data may then be sent to the recipient 208 as converted to the second language. The message data sent to the recipient 208 may also have had the language errors corrected and may be in the second language. This means the message may be presented or played for the user after the message insert has been presented or played or suppression has taken place.

Figure 3:
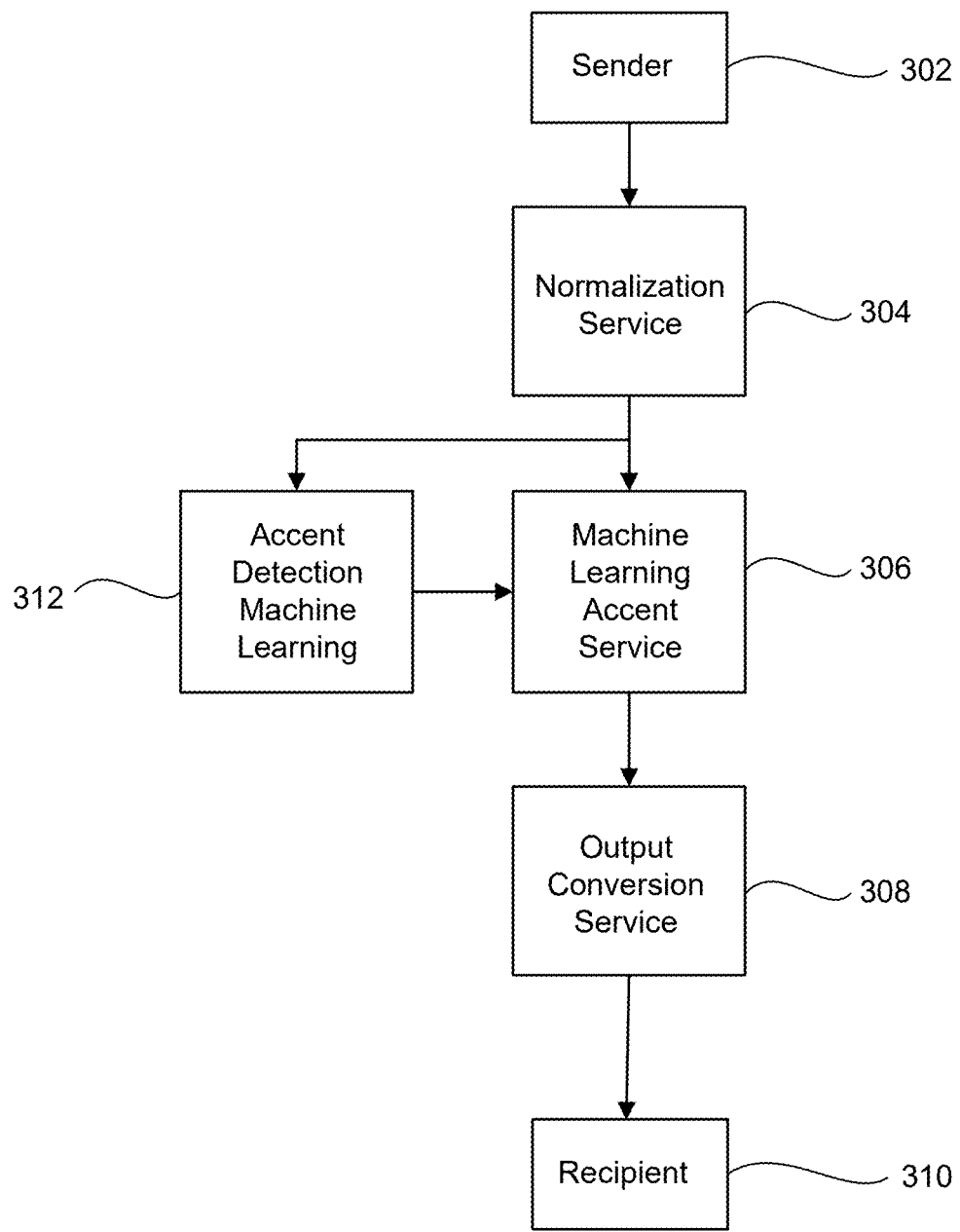
FIG. 3 is a flowchart illustrating an example of a system and method for correcting or modifying an accent of a person using a communication channel.

FIG. 3 is a block diagram illustrating a system for correcting or modifying an accent of a person using a communication channel. An initial operation may be receiving message data from a sender 302 to be sent across a computer network to a recipient 310.

Language errors in the message data may be corrected using a normalization service 304 to provide a corrected message. The message data may also be converted to a defined accent, using a machine learning accent service 306.

In one example, the message data can be converted to the defined accent based on a personalization profile for the recipient. The personalization profile may contain information about the recipient. The conversion to a defined accent may take place based in part on at least one of: a recipient education level, a recipient purchasing profile, an age of the recipient, a known location of the recipient, or a technology type (e.g., software application type, mobile hardware, etc.) being supported. In another example, converting to the defined accent may include an accent based on at least one of: a customer accent selection, nationality selection, gender selection (e.g., speak with someone who sounds like a man or woman), or a language selection.

The defined accent may be a neutral accent that can be understood by many speakers of that language. For example, the English language may be converted to a mid-western accent which is understandable to many American English speakers. In another example, the English language may be converted to the Queen's English accent which can be understood in many countries that speak English. This may also apply to other languages such as Spanish where the Rolo accent of Colombia is know to be widely understandable. As information is collected about the recipient of a translation, the system can personalize the accent that the person desires to hear or is likely to clearly understand. The system and process may collect any data about a person or a person's preference that affects the quality of the interaction. This may allow the system to make the communication sessions better over time and personalized to any given individual.

The message data with the defined accent can then be converted to an output format, using an output conversion service 308 or machine learning accent service 306. In some configurations, the message data may be converted to an intermediate format before being converted to a final format. For example, the message data can be converted to an intermediate format by converting audio data to text data. The text data may then be converted to another accent and then back to audio output data for the recipient 310. The message data in the output format can then be sent to the recipient 310 to be reproduced for the recipient.

In one example, the accent of the sender may be detected by an accent detection machine learning service 312. The message data may be converted to the defined accent that most closely approximates the accent of the sender. The detected accent of the sender 302 may be submitted to the machine learning accent service 306 so that the machine learning accent service 306 may determine the accent into which to translate the messages of the sender.

Figure 4:
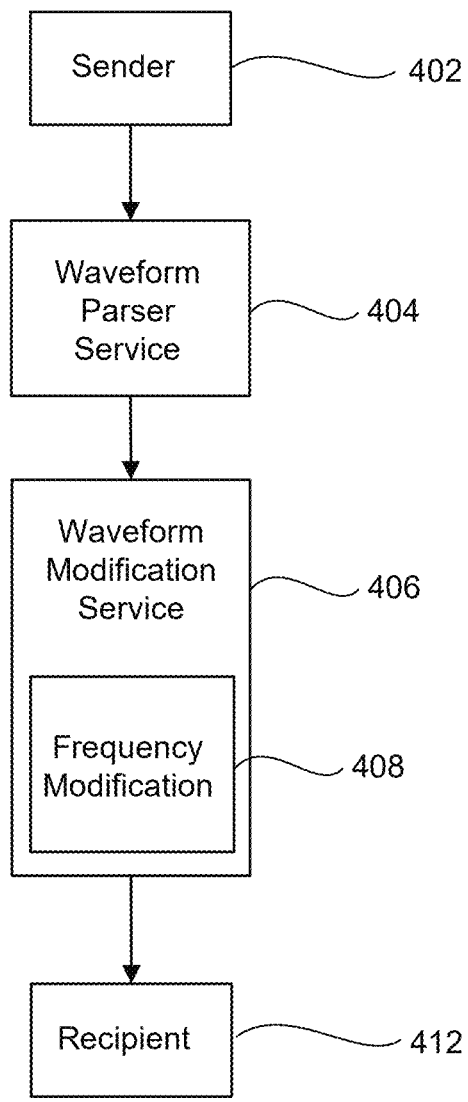
FIG. 4 is a block diagram illustrating an example a system and method for modifying an accent using a wave form modification service.

FIG. 4 is a block diagram illustrating an example system and method for modifying an accent. Message data representing human speech may be received from a sender 402. Individual words may be parsed from the message data by identifying electronic waveforms of the individual words using a waveform parser service 404.

This parser process may include separating the wave form of each word from other words and/or identifying the word itself in the language being received. For example, data may be inserted before each word and/or after each word to identify the beginning or ending of the waveform for a word. If desired, the individual phonemes of the individual words can be detected from within the waveforms representing the words. This may allow a waveform of words and/or phonemes to be corrected to represent the replacement accent.

The individual words and phonemes may be detected using the machine learning service that has been trained using an accent corresponding to an accent of the sender. For example, if the sender speaks with a southern United States accent then the machine learning service may have been trained to receive input using a southern United States accent.

The electronic waveforms of individual words may be modified from an original accent to form or generate electronic waveforms that represent a replacement accent, using a waveform modification service 406. The selection of a replacement waveforms may take place by mapping the individual words to text words or other index values (e.g., numbers or symbols) to enable look up of a waveform correction or replacement (e.g., an entire waveform replacement) or a correction function to modify the waveforms in order to modify the individual words to reflect the second accent. The frequency of waveforms may also be increased or decreased in order to change a perceived gender or age of the sender, using a frequency modification service 408 or module in the waveform modification service. The message data may then be sent to a recipient 412 across a computer network for audible output (or visible output).

Figure 5:
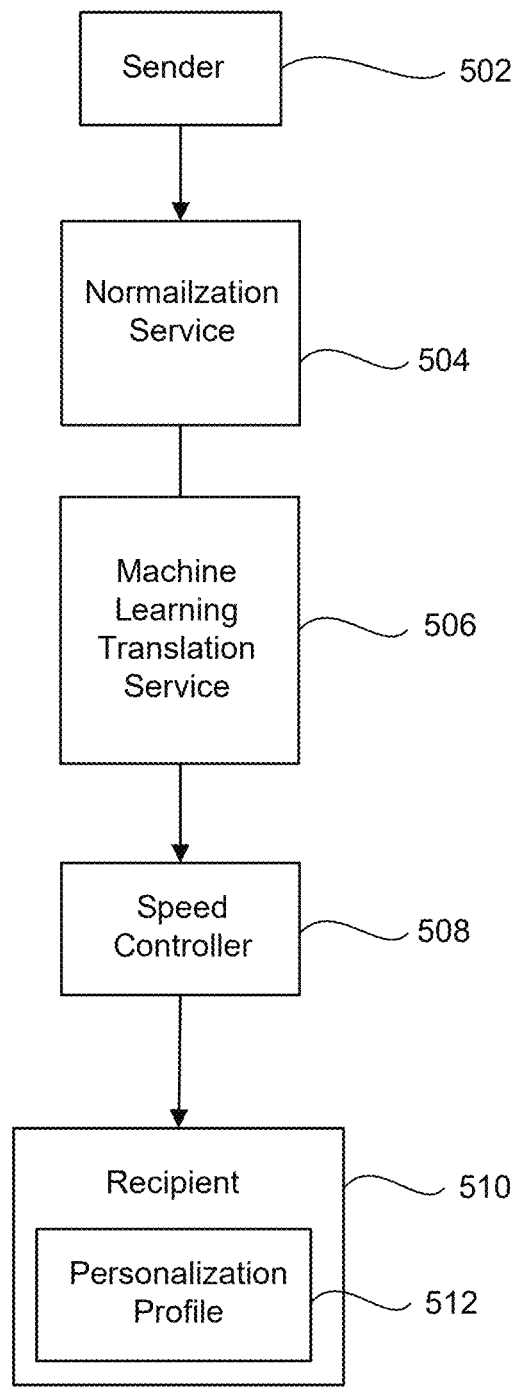
FIG. 5 is a block diagram of an example of a system for modifying the speed of the output of modified communications.

FIG. 5 is a block diagram of an example of a system for modifying the speed of the output of modified messages or communications. The system and method can be provided for modifying a translation output that uses machine learning. Initially, message data may be received from a sender 502 to be sent to a recipient 510. Errors in the message data may be corrected using a normalization service 504 to provide a corrected message. The message data may be converted to a second language using a machine learning translation service 506. Optionally, the message data may be converted to an intermediate format that is text.

A speed factor may be set at a speed controller 508 for the message data to be output at a defined rate. The speed controller 508 may be on a server or on a client device controlled by the recipient 512. In one configuration, the speed of playback of the message data can be increased or decreased based on the speed factor. The speed factor may be set based in part on a personalization profile 512 stored for the recipient 510 on a client device or in a server in a cloud computing service.

In one example, the speed factor may be set manually by the sender or through a sender's client. In another example, a speed at which the sender's message is played back may be received as a playback value or classification provided by the recipient and stored in the personalization profile 512. As a result, the recipient 510 of the message may have user interface controls provided that can be used during playback that may allow the recipient to be able to change the playback speed before playback or as playback occurs. The playback value may be a number (e.g., a value from 1 to 10 or 1 to 100) or the playback value may be a classification (e.g., low speed, medium speed, fast speed).

The message data may be converted to an output format (e.g., language, text, audio, animation, video, etc.). The conversion to an output format may include converting to an output format that includes at least one of: an accent selection, nationality selection, gender selection, or language selection. The conversion of the message data to an output format may be performed based on a personalization profile 512 for the recipient 510. The conversion to the output format may also be based in part on at least one of: a recipient education level, a purchasing profile, an age of the recipient, a known location of the recipient, or a technology type being supported. Then, the message data may be sent to the recipient to be reproduced for the recipient at the defined rate.

A user's (e.g., the sender or recipient) preferences may be stored locally in a personalization profile 510 or in a networked data store and can be associated with a user account. The system can incorporate user information (for either the sending or receiving end or both ends) over time. The system can also be adaptive based on past experience and performance as determined by algorithms, or reflect direct user-selected preferences, or feedback), to provide: a preferred accent, a preferred language, a preferred gender, a preferred talking speed, preferred "Auto-Filler" phrases, and/or preferred names.

Figure 6:
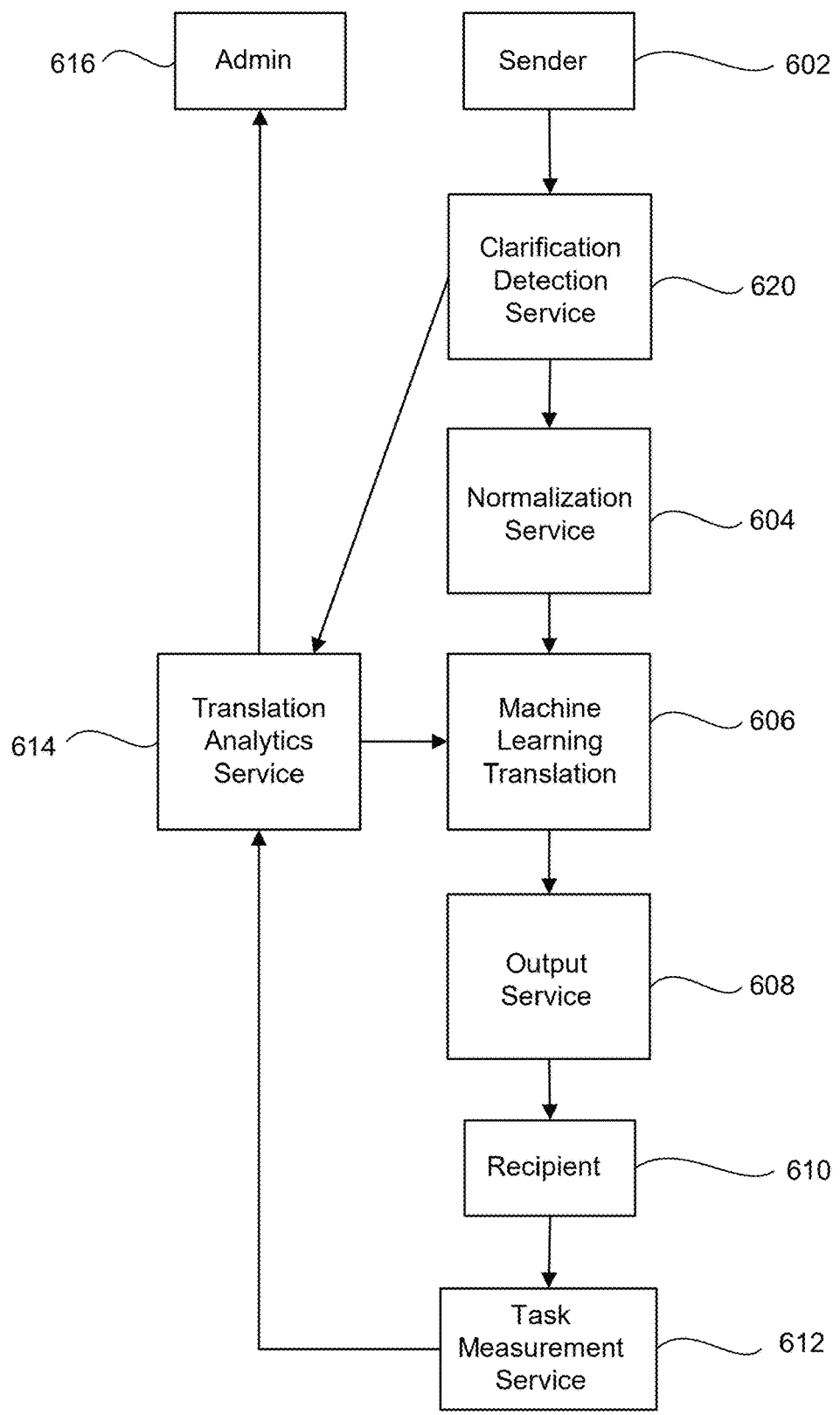
FIG. 6 is a block diagram illustrating a system and a method for assessing the quality of a translation pipeline that uses machine learning.

FIG. 6 is a block diagram illustrating a system and a method for assessing quality of a translation pipeline that uses machine learning. Message data may be received from a sender 602 to be sent to a recipient 610. Errors in the message data (i.e., language errors or other language changes as described earlier) may be corrected using a normalization service 604 to provide a corrected message. The message data may be translated to a second language (or accent, region, etc.), using a machine learning translation service 606.

The message data may be sent to the recipient 610 to be reproduced using an output service 608 for the recipient 610. A time length of task completion by the recipient 610 as requested in the message data may then be measured using a task measurement service 612. The time length of task completion may be measured by software or hardware instrumentation in an application the recipient is working on or through APIs integrated into the application the recipient is working on. The time length of task completion may be sent to a translation analytics service 614 for further analysis and review.

The time used during an interaction for a given task or length of chat for a given task may be tracked. If the customer has to ask for clarification, then the message is not being understood by the customer or user. The time length of task completion may be used to determine whether a successful or unsuccessful translation has occurred. Faster task completion times may be identified that represent successful translations. In contrast, slower task completion times may be identified that represent unsuccessful translations. The identification of faster and slower task completion times may be performed by a translation analytics service 614. This may allow feedback to be provided to machine learning translation service 606. For example, training data that represents successful and unsuccessful translation session may be used as labels for training data for re-training the machine learning translation.

The task measurement service 612 may be used to track how much time is used for a customer or user to complete an action being described by an agent. When the agent is able to get the message across to the recipient to do the task faster, then the system knows the agent is more successful with that recipient, person or customer. The system can track what actions a customer takes to see if the message is getting through. The system can also correlate the answer received to the answer that is expected in order to determine if success has been reached.

Another aspect of determining quality feedback may be based in part on whether a customer is able to take requested actions in a web application, client application or other application. If the customer cannot perform the actions (e.g., the actions are unsuccessful), then the translation may be deemed to be low quality. These actions that are tracked may be granular actions, events or groups of events in the task software. More complex actions may be tracked or may be the responsibility of the sender (e.g., a human tech support agent). Accordingly, quality feedback may be determined based in part on whether a customer is able to perform requested actions.

The system may also measure a number of clarification requests from the recipient associated with the message data. This may be detected by the clarification detection service 620, normalization service 604, or machine learning translation service 606 that can detect language that is asking for clarifications. For example, statements such as: "Can you repeat that?", "Pardon?", "I don't understand", "I'm confused", "Huh" or similar statements by a sender 602 can be identified.

A quality threshold for the number of clarification requests may be set. The number of clarification requests may be tracked by the clarification detection service 620 or the translation analytic service 614. A translation session to the second language may be determined to be lower quality when the quality threshold is reached by receiving the number of clarification requests. Conversely, a translation session that does not receive a number of clarification requests that reach a quality threshold may be deemed to be of higher quality.

Another process for determining the quality of a translation session may be presenting the recipient with a quality feedback survey upon completion of a task. Survey input may be gathered after the call/chat/email from both the customer and the support center representative. This quality feedback survey may be sent from the translation analytics service 614 or through another service after the translation session has ended. Thus, the quality of a translation may be determined based on responses to the quality feedback survey.

Other types of survey feedback may determine whether the correct actions are occurring for a customer. Did the wrong part show up, was the wrong information received, was the wrong email recorded, etc. This type of action driven feedback can provide information regarding whether the translations are occurring correctly. This is objective evidence based what is occurring with the transaction or session. This data may be provided for both text chat and voice chat.

On the support or administration side, all of the data about the system may be summarized and provided to management or an admin interface 616. The support side of the software may allow managers see all the data about what the chat engine did, what was translated, how long correction and/or translation took, what the customer's responses were, etc.

In another configuration, the performance of a communication session may be determined by measuring the overall session length. A session length for communication between the sender and recipient may be tracked. The duration of call/chat/email as compared to the duration of previous communications can be used to track system improvement. The communications may be determined as improving when the session length is decreased as compared to similar sessions. If the session length times are increasing this may be deemed as decreasing in quality. If the duration of sessions is decreasing this may be an indicator that the quality of the translations is increasing. The sessions may be broken down by subject, topic or type for comparisons of session length to each other. For example, the duration of call/chat/email sessions currently performed by human operators with different sorts of language differences (with accent, without accent, language 1 translated to language 2, language 3 translated to language 4, etc.) can be used as an initial standard and potential goal. Similarly, the use of records of raw calls/chats/email communications may be compared to the corrected communications to isolate and correct system deficiencies.

Figure 7:
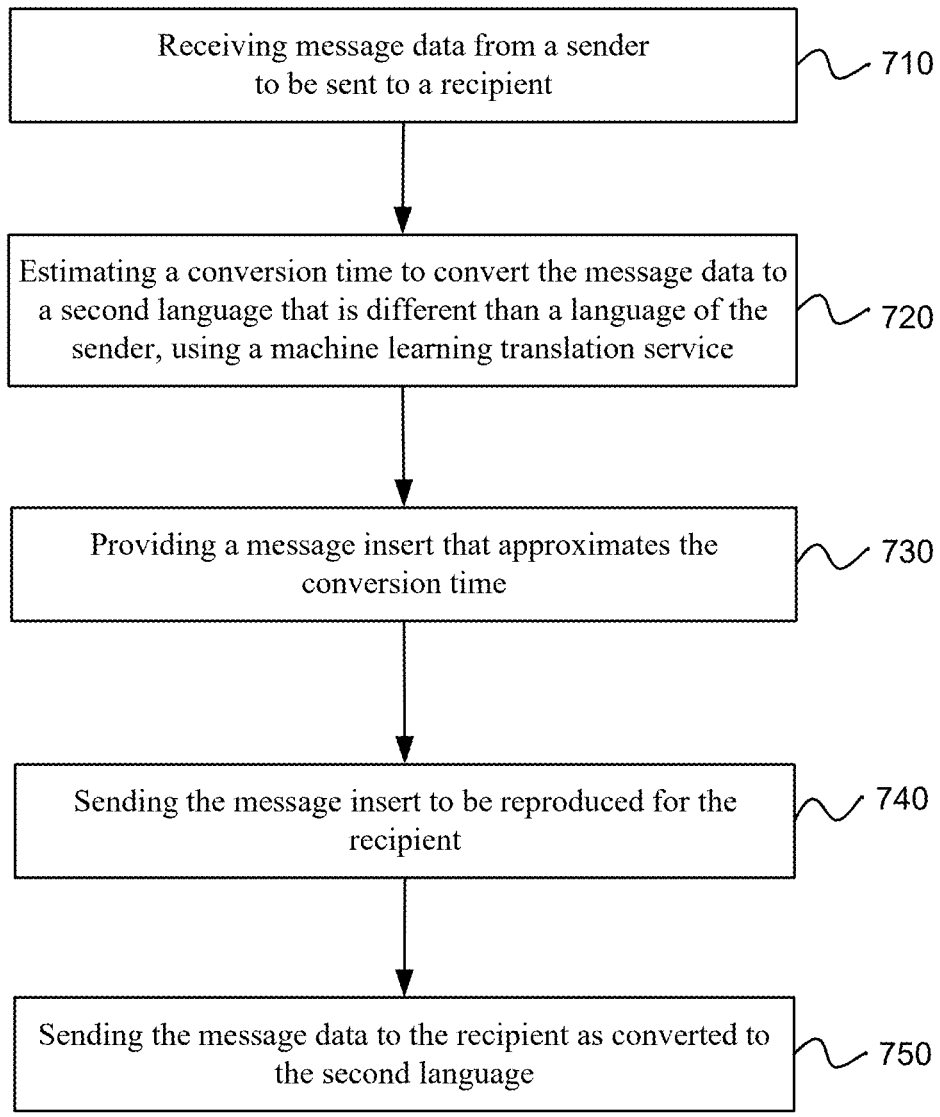
FIG. 7 is a flowchart illustrating a method for adding inserted message data into machine learning modified communications.

FIG. 7 is a flowchart illustrating a method for adding inserted message data into machine learning modified communications. One operation can be receiving message data from a sender to be sent to a recipient, as in block 710. Another operation may be estimating a conversion time to convert the message data to a second language that is different than a language of the sender, using a machine learning translation service, as in block 720.

A message insert that approximates the conversion time may be identified, as in block 730. Alternatively, the message insert may be generated as needed. The message insert may be sent to client device or client software to be reproduced for the recipient, as in block 750. The message data may also be sent to the recipient as converted to the second language, as in block 760.

Figure 9:
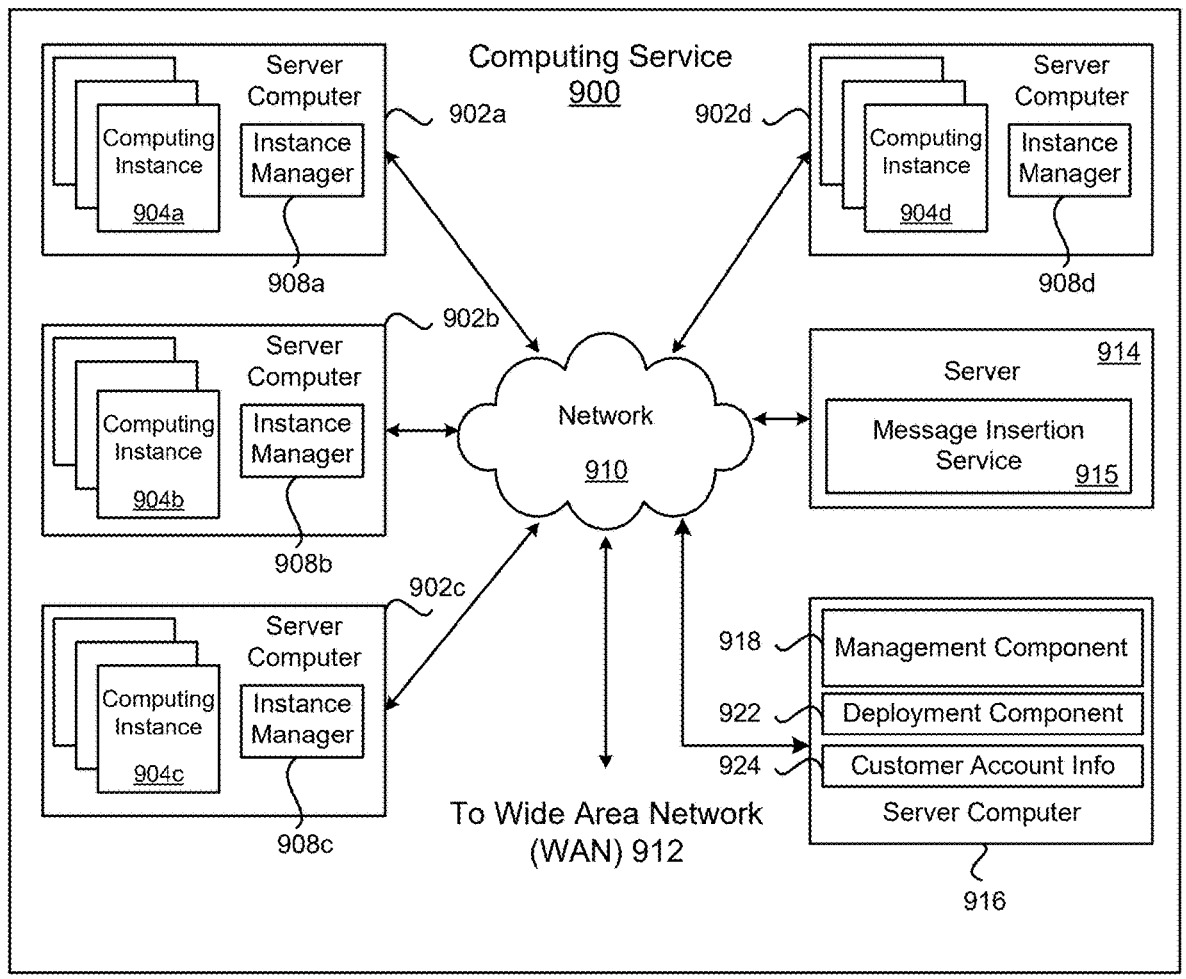
FIG. 9 is a block diagram of a service provider environment according to an example of the present technology.

FIG. 9 is a block diagram illustrating an example computing service 900 that may be used to execute and manage a number of computing instances 904a-d upon which the present technology may execute. In particular, the computing service 900 depicted illustrates one environment in which the technology described herein may be used. The computing service 900 may be one type of environment that includes various virtualized service resources that may be used, for instance, to host computing instances 904*a-d*.

The computing service 900 may be capable of delivery of computing, storage and networking capacity as a software service to a community of end recipients. In one example, the computing service 900 may be established for an organization by or on behalf of the organization. That is, the computing service 900 may offer a "private cloud environment." In another example, the computing service 900 may support a multi-tenant environment, wherein a plurality of customers may operate independently (i.e., a public cloud environment). Generally speaking, the computing service 900 may provide the following models: Infrastructure as a Service ("IaaS") and/or Software as a Service ("SaaS"). Other models may be provided. For the IaaS model, the computing service 900 may offer computers as physical or virtual machines and other resources. The virtual machines may be run as guests by a hypervisor, as described further below. The PaaS model delivers a computing system that may include an operating system, programming language execution environment, database, and web server.

Application developers may develop and run their software solutions on the computing service system without incurring the cost of buying and managing the underlying hardware and software. The SaaS model allows installation and operation of application software in the computing service 900. End customers may access the computing service 900 using networked client devices, such as desktop computers, laptops, tablets, smartphones, etc. running web browsers or other lightweight client applications, for example. Those familiar with the art will recognize that the computing service 900 may be described as a "cloud" environment.

The particularly illustrated computing service 900 may include a plurality of server computers 902*a-d*. The server computers 902*a-d* may also be known as physical hosts. While four server computers are shown, any number may be used, and large data centers may include thousands of server computers. The computing service 900 may provide computing resources for executing computing instances 904*a-d*. Computing instances 904*a-d* may, for example, be virtual machines. A virtual machine may be an instance of a software implementation of a machine (i.e. a computer) that executes applications like a physical machine. In the example of a virtual machine, each of the server computers 902*a-d* may be configured to execute an instance manager 908*a-d* capable of executing the instances. The instance manager 908*a-d* may be a hypervisor, virtual machine manager (VMM), or another type of program configured to enable the execution of multiple computing instances 904*a-d* on a single server. Additionally, each of the computing instances 904*a-d* may be configured to execute one or more applications.

A server 914 may be reserved to execute software components for implementing the present technology or managing the operation of the computing service 900 and the computing instances 904*a-d*. For example, the server 914 may include a message insertion service 915. Other services that may be hosted on a server 914 or virtualized server may be: a time estimation service for estimating a length of time for a conversion or translation of a message, a machine learning accent service, a message suppression service, a waveform modification service or services described in this disclosure.

A server computer 916 may execute a management component 918. A customer may access the management component 918 to configure various aspects of the operation of the computing instances 904*a-d* purchased by a customer. For example, the customer may setup computing instances 904*a-d* and make changes to the configuration of the computing instances 904*a-d*.

A deployment component 922 may be used to assist customers in the deployment of computing instances 904*a-d*. The deployment component 922 may have access to account information associated with the computing instances 904*a-d*, such as the name of an owner of the account, credit card information, country of the owner, etc. The deployment component 922 may receive a configuration from a customer that includes data describing how computing instances 904*a-d* may be configured. For example, the configuration may include an operating system, provide one or more applications to be installed in computing instances 904*a-d*, provide scripts and/or other types of code to be executed for configuring computing instances 904*a-d*, provide cache logic specifying how an application cache is to be prepared, and other types of information. The deployment component 922 may utilize the customer-provided configuration and cache logic to configure, prime, and launch computing instances 904*a-d*. The configuration, cache logic, and other information may be specified by a customer accessing the management component 918 or by providing this information directly to the deployment component 922.

Customer account information 924 may include any desired information associated with a customer of the multi-tenant environment. For example, the customer account information may include a unique identifier for a customer, a customer address, billing information, licensing information, customization parameters for launching instances, scheduling information, etc. As described above, the customer account information 924 may also include security information used in encryption of asynchronous responses to API requests. By "asynchronous" it is meant that the API response may be made at any time after the initial request and with a different network connection.

A network 910 may be utilized to interconnect the computing service 900 and the server computers 902*a-d*, 916. The network 910 may be a local area network (LAN) and may be connected to a Wide Area Network (WAN) 912 or the Internet, so that end customers may access the computing service 900. In addition, the network 910 may include a virtual network overlaid on the physical network to provide communications between the servers 902*a-d*. The network topology illustrated in FIG. 9 has been simplified, as many more networks and networking devices may be utilized to interconnect the various computing systems disclosed herein.

Figure 10:
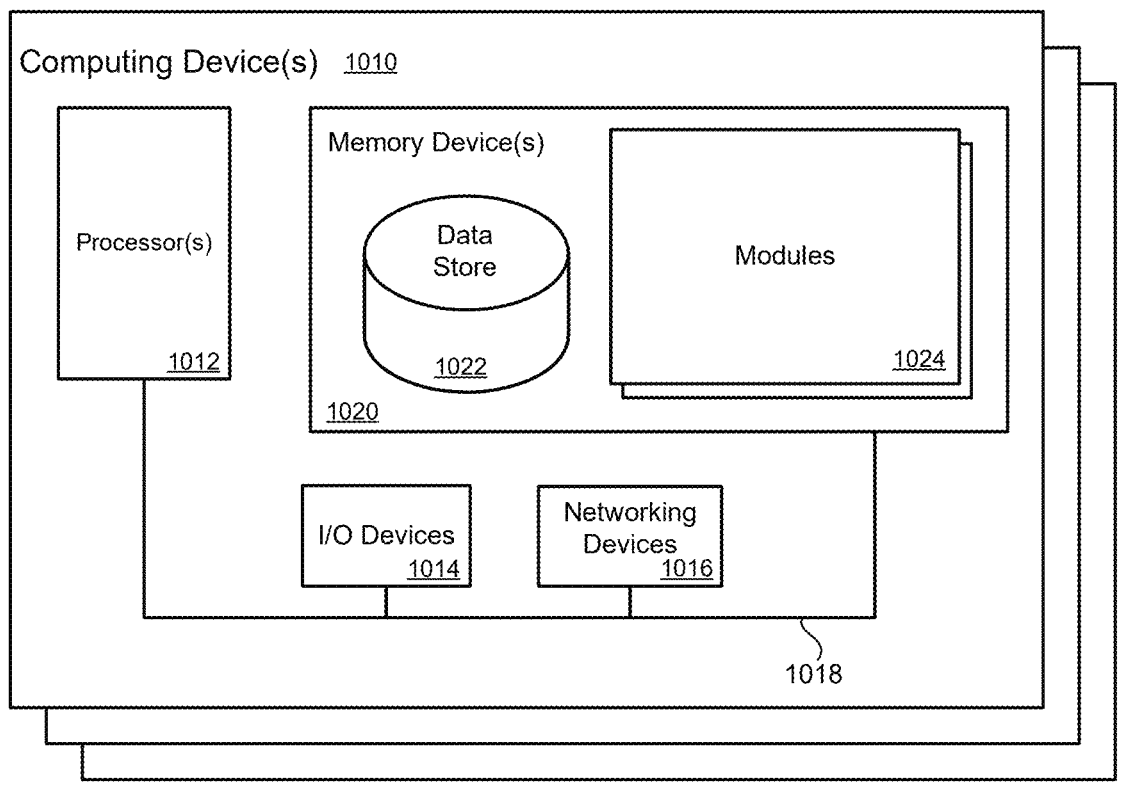
FIG. 10 is a block diagram that provides an example illustration of a computing device that may be employed in the present technology.

FIG. 10 illustrates a computing device 1010 on which modules of this technology may execute. The computing device 1010 is illustrated on which a high level example of the technology may be executed. The computing device 1010 may include one or more processors 1012 that are in communication with memory devices 1020. The computing device may include a local communication interface 1018 for the components in the computing device. For example, the local communication interface may be a local data bus and/or any related address or control busses as may be desired.

The memory device 1020 may contain modules 1024 that are executable by the processor(s) 1012 and data for the modules 1024. The modules 1024 may execute the functions described earlier. A data store 1022 may also be located in the memory device 1020 for storing data related to the modules 1024 and other applications along with an operating system that is executable by the processor(s) 1012.

Other applications may also be stored in the memory device 1020 and may be executable by the processor(s) 1012. Components or modules discussed in this description that may be implemented in the form of software using high programming level languages that are compiled, interpreted or executed using a hybrid of the methods.

The computing device may also have access to I/O (input/output) devices 1014 that are usable by the computing devices. An example of an I/O device is a display screen that is available to display output from the computing devices. Other known I/O device may be used with the computing device as desired. Networking devices 1016 and similar communication devices may be included in the computing device. The networking devices 1016 may be wired or wireless networking devices that connect to the internet, a LAN, WAN, or other computing network.

The components or modules that are shown as being stored in the memory device 1020 may be executed by the processor 1012. The term "executable" may mean a program file that is in a form that may be executed by a processor 1012. For example, a program in a higher level language may be compiled into machine code in a format that may be loaded into a random access portion of the memory device 1020 and executed by the processor 1012, or source code may be loaded by another executable program and interpreted to generate instructions in a random access portion of the memory to be executed by a processor. The executable program may be stored in any portion or component of the memory device 1020. For example, the memory device 1020 may be random access memory (RAM), read only memory (ROM), flash memory, a solid state drive, memory card, a hard drive, optical disk, floppy disk, magnetic tape, or any other memory components.

The processor 1012 may represent multiple processors and the memory 1020 may represent multiple memory units that operate in parallel to the processing circuits. This may provide parallel processing channels for the processes and data in the system. The local interface 1018 may be used as a network to facilitate communication between any of the multiple processors and multiple memories. The local interface 1018 may use additional systems designed for coordinating communication such as load balancing, bulk data transfer, and similar systems.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together, but may comprise disparate instructions stored in different locations which comprise the module and achieve the stated purpose for the module when joined logically together.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices. The modules may be passive or active, including agents operable to perform desired functions.

The technology described here can also be stored on a computer readable storage medium that includes volatile and non-volatile, removable and non-removable media implemented with any technology for the storage of information such as computer readable instructions, data structures, program modules, or other data. Computer readable storage media include, but is not limited to, RAM, ROM, EEPROM, flash memory or other memory technology, CD-ROM, digital versatile disks (DVD) or other optical storage, magnetic cassettes, magnetic tapes, magnetic disk storage or other magnetic storage devices, or any other computer storage medium which can be used to store the desired information and described technology.

The devices described herein may also contain communication connections or networking apparatus and networking connections that allow the devices to communicate with other devices. Communication connections are an example of communication media. Communication media typically embodies computer readable instructions, data structures, program modules and other data in a modulated data signal such as a carrier wave or other transport mechanism and includes any information delivery media. A "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared, and other wireless media. The term computer readable media as used herein includes communication media.

Furthermore, the described features, structures, or characteristics may be combined in any suitable manner in one or more examples. In the preceding description, numerous specific details were provided, such as examples of various configurations to provide a thorough understanding of examples of the described technology. One skilled in the relevant art will recognize, however, that the technology can be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements can be devised without departing from the spirit and scope of the described technology.

The invention claimed is:

1. A method for adding inserted message data into machine learning modified communications, comprising:
   receiving message data from a sender to be sent to a recipient;
   estimating a conversion time to convert the message data to a second language that is different than a language of the sender, using a machine learning translation service;

providing a message insert that approximates the conversion time;

sending the message insert to be reproduced for the recipient; and sending the message data to the recipient as converted to the second language.

2. The method as in claim 1, further comprising:

estimating a correction time to correct language errors in the message data using a normalization service to provide a corrected message;

providing a message insert that approximates the correction time and conversion time; and sending the message data to the recipient with language errors corrected and in the second language.

3. The method as in claim 2, further comprising:

converting the speech data to text data using a speech recognition service; or converting text data to speech data.

4. The method as in claim 1, further comprising message data that is speech data or text data.

5. The method as in claim 1, further comprising adding the message insert from a library of at least one of: sounds, spoken phrases, text phrases, or video clips.

6. The method as in claim 5, wherein the library of message inserts is a topically related library, use case library, or a task related library.

7. The method as in claim 1, further comprising providing a library of message inserts.

8. The method as in claim 1, further comprising suppressing a message phrase sent by the sender when the message phrase is similar to a recently provided message insert.

9. The method as in claim 1, further comprising adjusting a time length of the message insert to match or exceed a latency period that has been estimated for conversion to a second language.

10. The method as in claim 1, further comprising selecting a message insert to match a task estimation time for a defined task for a human agent.

11. The method as in claim 1, further comprising selecting a message insert to match a task estimation time for a defined task for a human agent, wherein the task estimation time is received from an estimation process in an application the human agent is using.

12. The method as in claim 1, wherein message data received as input is speech data or text data and message data provided as output is speech data or text data.

13. The method as in claim 1, further comprising correcting at least one of: grammar correction, slang term correction, incorrect term correction, incorrect words, user customizations, removal of filler words, speech disfluencies, repetitions, stuttering, sentence breaks, or punctuation.

14. The method as in claim 1, where the second language is a second human language, a different dialect, or a different accent.

* * * * *